Oct. 25, 1932.  J. S. BAKER  1,884,511
WINDMILL CONSTRUCTION
Filed July 31, 1930
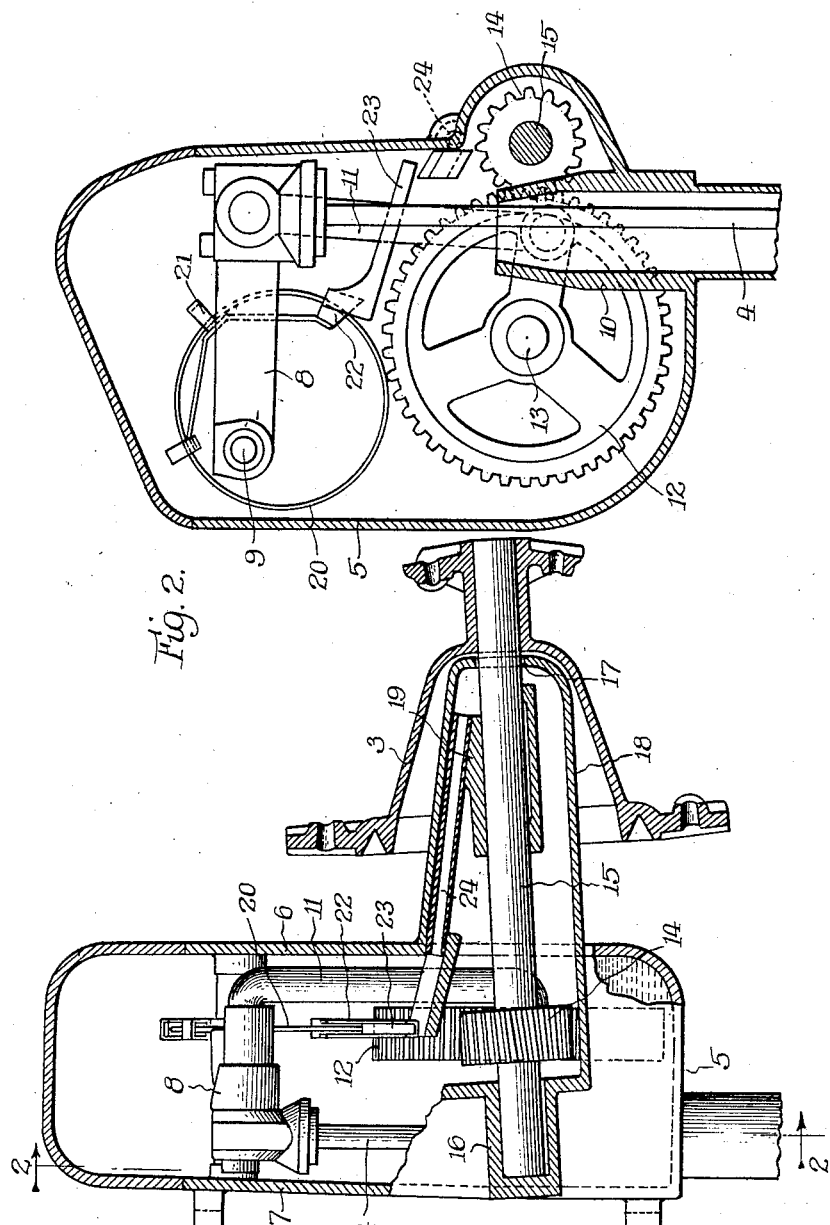

Patented Oct. 25, 1932

1,884,511

UNITED STATES PATENT OFFICE

JOHN SAYRES BAKER, OF EVANSVILLE, WISCONSIN

WINDMILL CONSTRUCTION

Application filed July 31, 1930. Serial No. 471,942.

This invention relates to improvements in windmill constructions and more particularly to those of the self-lubricated type.

In self-oiled windmills, escape of oil from the enclosing casing by working out along the wind-wheel shaft can be effectually prevented by inclining the wind-wheel shaft, that is to say, by elevating the wheel end of the shaft. This has the advantage of bringing the wheel's center of weight and surface closer to the vertical axis of the mill without reducing clearance with the tower.

The primary object of the present invention is to compensate for the inclination of the wind-wheel and crank shafts in a self-oiled windmill by providing a novel gear connection which overcomes the high friction and therefore short life which characterizes the worm gears heretofore employed.

In carrying out this object, I utilize gears of the spur type and compensate for the angularity of their axes by spiraling the teeth of one or both of them.

The invention also resides in the particular manner of spiraling the gears above referred to so as to minimize wear and tear on the gears and their associated bearings.

Other objects and advantages of the invention will become apparent from the following detailed description taken in conjunction with the accompanying drawing, in which Figure 1 is a vertical sectional view of the operating mechanism of a windmill embodying the features of the present invention.

Fig. 2 is a sectional view taken approximately along the plane of the line 2—2 in Fig. 1.

In the exemplary form shown in the drawing, the invention is embodied in the operating mechanism of a windmill which is adapted to convert the rotary motion of the wind-wheel carried by a hub 3 into reciprocatory motion for actuating a pitman 4. The major parts of the mechanism are housed within a casing 5 whose front wall 6 and rear wall 7 support the pitman guide which in the present instance is in the form of a rocker arm 8 pivoted at 9 in the upper portion of the casing. The free end of the arm is joined to the upper end of the pitman which extends through a tubular projection 10 upstanding from the bottom of the casing 5 so that the lowermost portion of the casing is adapted to contain a substantial quantity of lubricating fluid.

The free end of the rocker arm is also joined to one end of a connecting rod 11 which is actuated by a crank in the form of a gear 12 supported on a stub shaft 13 to rotate about a horizontal axis. The gear 12 meshes with a pinion 14 on a shaft 15 which is disposed above the level of the oil in the casing and carries the wind-wheel at its outer end.

The inner end of the shaft 15 is journaled in a bearing 16 supported by the casing 5. The outer end extends through an opening 17 in a hollow extension 18 of the front casing wall 6 and is journaled adjacent the hub 3 in a bearing 19 formed within and supported by the extension 18.

The bearing 19 may be lubricated by any suitable means for elevating oil from the oil receptacle to a point above the bearing from which the oil may flow by gravity to the bearing. In the form shown herein, this elevating means includes a ring 20 resting on the periphery of the gear 12 which dips in the oil. In the rotation of the gear, the ring 20 is rotated and the oil adhering to its surface is diverted by scrapers 21 and 22 into an inclined trough 23 from which it is conveyed by a tube 24 to the shaft 15 at a point just beyond the outer end of the bearing 19.

To prevent the lubricating fluid thus delivered to the bearing 19 from working out along the shaft 15 through the opening 17 and thereby becoming lost, the bearings 16 and 19 are constructed to support the shaft in inclined position with its outer end disposed above the inner end. With this arrangement, a flow of the bearing lubricant down along the shaft will be induced by gravity and a part of the lubricant dropping from the tube 24 will flow into the bearing 19 and the excess will fall to the bottom of the casing extension 18 and eventually drain back into the oil receptacle. Loss of lubricant through the opening 17 is thereby effectually prevented.

The angular relationship of the shafts 13 and 15 may be compensated for without complicating the structure by spiraling the teeth of the gear 12 and the pinion 14 relative to each other. For the sake of simplicity, the teeth of only one of these gears is spiraled in the present instance, this gear being the pinion 14.

Spur gears constitute a most economical and efficient type of power transmitting connection between the driving and driven shafts and their use is made possible by the spiraling above referred to.

I claim as my invention:

1. In a self-oiled windmill, the combination of a hollow casing, the lower portion of which constitutes a receptacle for oil, a spur gear mounted in the casing to turn on a horizontal axis, a wind-wheel outside of said casing, an inclined shaft carrying said wheel and projecting through and journaled in an extension of said casing, the outer end of the wheel shaft being higher than the inner end, a driving pinion gear on the inner end meshing with said spur gear, the teeth of one of said gears being spiraled to compensate for the angle between the axes thereof, means for supplying oil from said receptacle to said journal, and a drain for returning the surplus oil from said shaft journal to said oil receptacle.

2. In a self-oiled windmill, the combination of a casing providing an oil receptacle, a wind-wheel shaft having one end projecting through said casing, the outer end of said shaft being higher than the inner end to prevent the oil in said receptacle from working out of the casing along the shaft, a spur gear on said shaft, and a spur crank gear meshing with said first mentioned gear and mounted within said casing to turn on a horizontal axis, the teeth on one of said gears being spiraled to compensate for the angle between the gear axes.

3. In a self-oiled windmill, the combination of a casing providing a receptacle for lubricating fluid, a wind-wheel shaft having one end projecting through said casing, a pair of spaced bearings mounted within said casing on opposite sides thereof and supporting said shaft with its outer end disposed above its inner end, a crank gear journaled in said casing, a pinion on said shaft driving said gear, and means including said crank gear for conveying lubricating fluid from said receptacle to said shaft at a point beyond the upper bearing, the lubricating fluid by virtue of the inclination of said shaft flowing by gravity away from the outer end of said shaft.

In testimony whereof, I have hereunto affixed my signature.

JOHN SAYRES BAKER.